P. E. LOWER.
FISHING TOOL.
APPLICATION FILED JULY 11, 1910.
985,817.
Patented Mar. 7, 1911.
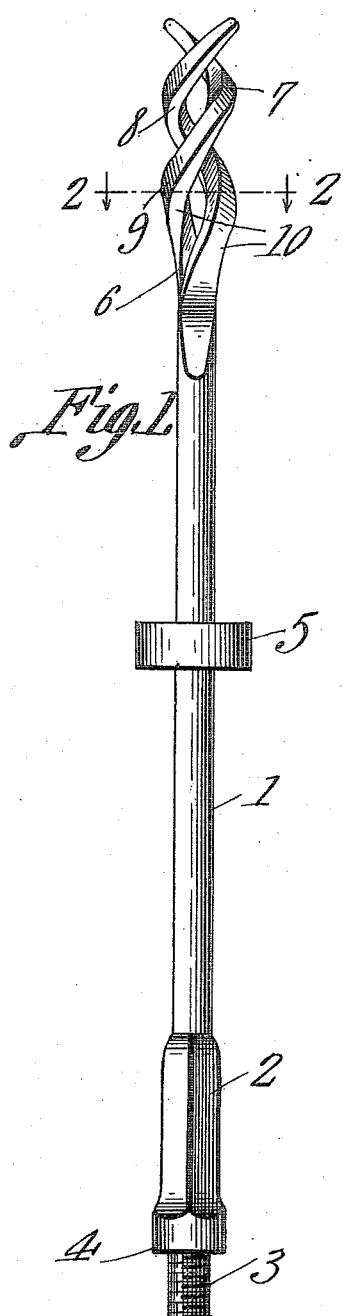
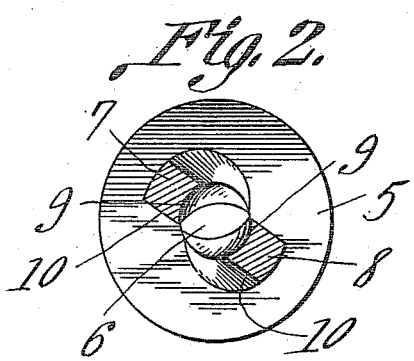
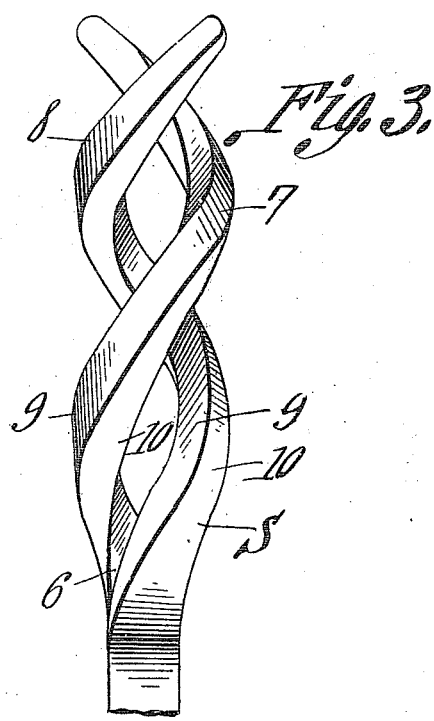
Witnesses
Prince E. Lower, Inventor
by C. A. Snow & Co.
Attorneys

UNITED STATES PATENT OFFICE.

PRINCE E. LOWER, OF ST. FRANCISVILLE, ILLINOIS, ASSIGNOR OF ONE-HALF TO CHARLIE C. CLARKSON, OF ST. FRANCISVILLE, ILLINOIS.

FISHING-TOOL.

985,817.

Specification of Letters Patent.  Patented Mar. 7, 1911.

Application filed July 11, 1910.  Serial No. 571,456.

*To all whom it may concern:*

Be it known that I, PRINCE E. LOWER, a citizen of the United States, residing at St. Francisville, in the county of Lawrence and State of Illinois, have invented a new and useful Fishing-Tool, of which the following is a specification.

This invention consists of a tool for fishing or removing the valves from oil wells and the like.

The principal object of the invention is to provide a strong, simple, durable, comparatively inexpensive and thoroughly practical and efficient tool for removing valves and the parts thereof from the well casing.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of the claim without departing from the spirit of the invention.

In the accompanying drawings forming part of this specification:—Figure 1 is a side elevation of a fishing tool constructed in accordance with the present invention.
Fig. 2 is a section on the line 2—2 of Fig. 1. Fig. 3 is an enlarged side elevation of the fishing end of the tool.

Like reference numerals indicate corresponding parts in the different figures of the drawing.

The fishing tool of the present invention is constructed with a shank 1 having at one end thereof a tapered enlargement 2 and a threaded stud 3 which is intended to be secured to a socket in the rod by means of which the fishing tool is to be lowered into the well casing, a shoulder 4 being formed at the upper end of the tapered enlargement 2. Slidably mounted upon the shank 1 so as to be capable of movement between the ends of the shank is a collar 5 which acts as a guide member during the movement of the shank 1 in the valve casing. At its lower end, the shank 1 is bifurcated as indicated at 6 and provided with a pair of prongs 7 and 8. Each of the prongs 7 and 8 is formed with flat faces 9 and 10 as shown best in Fig. 3 and is twisted from end to end so as to give a spiral twist to the flat faces
9 and 10. In addition to the torsional twist which is imparted to each of the prongs 7 and 8 said prongs are given an additional spiral bend around each other as indicated so as to produce a pair of approximately parallel spirally extending members separated from each other by a distance sufficient to receive the handle of the valve which is to be raised.

In operation, the device is lowered into the well from which the valve and connected parts are to be removed and, after the fishing tool comes in contact with the valve, is twisted so that the knuckle or handle of the valve is caused to pass upward between the spirally extending prongs 7 and 8. The valve can then be removed by withdrawing the fishing tool.

The tool of the present invention is very efficient in carrying out the purposes for which it is intended and serves to avoid the necessity of removing the well casing when it becomes necessary to withdraw the valve.

Having thus described the invention in such manner as to make its construction and operation clear to those skilled in the art to which the invention relates, what is claimed as new is:—

A fishing tool comprising a shank having at one end a tapered enlargement formed with a shoulder and a threaded stud extending outward from the shoulder, and at the other end a pair of spirally extending approximately parallel prongs, each of the prongs being twisted from end to end and the terminals being deflected outward to provide an entrance throat to facilitate the attachment of the implement to a valve, and a disk slidable on the shank between the enlargement and the prongs for guiding the tool in the well tube.

In testimony that I claim the foregoing as my own, I have hereto affixed my signature in the presence of two witnesses.

PRINCE E. LOWER.

Witnesses:
A. S. WARREN,
ULA J. TRUBY.

Copies of this patent may be obtained for five cents each, by addressing the "Commissioner of Patents, Washington, D. C."